US007724807B2

(12) United States Patent
Turetzky et al.

(10) Patent No.: US 7,724,807 B2
(45) Date of Patent: *May 25, 2010

(54) METHOD FOR REDUCING AUTO-CORRELATION OR CROSS-CORRELATION IN WEAK SIGNALS

(75) Inventors: Gregory Bret Turetzky, San Jose, CA (US); Charles P. Norman, Huntington Beach, CA (US); Henry D. Falk, Long Beach, CA (US)

(73) Assignee: SiRF Technology, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/498,532

(22) Filed: Aug. 2, 2006

(65) Prior Publication Data

US 2007/0030888 A1 Feb. 8, 2007

(51) Int. Cl.
*H04B 1/00* (2006.01)
(52) U.S. Cl. .................................................. 375/150
(58) Field of Classification Search ................. 375/148, 375/150, 152, 142–143, 343; 342/357.06, 342/357.1, 357.07, 357.12, 357.13; 455/226.1–226.4, 455/456.1, 456.3
See application file for complete search history.

(56) References Cited

U.S. PATENT DOCUMENTS

| 4,426,712 | A | 1/1984 | Gorski-Popiel |
| 4,445,118 | A | 4/1984 | Taylor et al. |
| 4,463,357 | A | 7/1984 | MacDoran |
| 4,578,678 | A | 3/1986 | Hurd |
| 4,667,203 | A | 5/1987 | Counselman, III |
| 4,701,934 | A | 10/1987 | Jasper |
| 4,754,465 | A | 6/1988 | Trimble |
| 4,785,463 | A | 11/1988 | Janc et al. |
| 4,809,005 | A | 2/1989 | Counselman, III |
| 4,821,294 | A | 4/1989 | Thomas, Jr. |
| 4,890,233 | A | 12/1989 | Ando et al. |
| 4,894,662 | A | 1/1990 | Counselman |
| 4,998,111 | A | 3/1991 | Ma et al. |

(Continued)

FOREIGN PATENT DOCUMENTS

EP 0511741 11/1992

(Continued)

OTHER PUBLICATIONS

Soliman et al., gps One: A hybrid position location system, 2000 IEEE, pp. 334-335.

(Continued)

*Primary Examiner*—Khanh C Tran
(74) *Attorney, Agent, or Firm*—Pillsbury Winthrop Shaw Pittman, LLP

(57) ABSTRACT

The present invention discloses methods, apparatuses, and systems for eliminating auto- and cross-correlation in weak signal CDMA systems, such as GPS systems. The invention uses parallel data paths that allow standard correlation of signals in parallel with verification of the lock signal to determine whether the system has locked onto the proper signal within the scanned signal window. The invention can be made with multiple CPUs, a single CPU with dual input modes, on multiple IC chips, or as a single IC chip solution for small, low cost reception, downconversion, correlation, and verification systems.

10 Claims, 6 Drawing Sheets

U.S. PATENT DOCUMENTS

| | | |
|---|---|---|
| 5,000,415 A | 3/1991 | Sandercock |
| 5,014,066 A | 5/1991 | Counselman, III |
| 5,036,329 A | 7/1991 | Ando |
| 5,043,736 A | 8/1991 | Darnell et al. |
| 5,108,334 A | 4/1992 | Eschenbach et al. |
| 5,140,308 A | 8/1992 | Tanaka |
| 5,202,829 A | 4/1993 | Geier |
| 5,225,842 A | 7/1993 | Brown et al. |
| 5,257,195 A | 10/1993 | Hirata |
| 5,293,170 A | 3/1994 | Lorenz et al. |
| 5,311,195 A | 5/1994 | Mathis et al. |
| 5,323,164 A | 6/1994 | Endo |
| 5,343,209 A | 8/1994 | Sennott et al. |
| 5,345,244 A | 9/1994 | Gildea et al. |
| 5,347,284 A | 9/1994 | Volpi et al. |
| 5,347,536 A | 9/1994 | Meehan |
| 5,379,224 A | 1/1995 | Brown et al. |
| 5,402,347 A | 3/1995 | McBurney et al. |
| 5,402,441 A | 3/1995 | Washizu et al. |
| 5,414,729 A | 5/1995 | Fenton |
| 5,416,712 A | 5/1995 | Geier et al. |
| 5,420,593 A | 5/1995 | Niles |
| 5,434,790 A | 7/1995 | Saka et al. |
| 5,440,313 A | 8/1995 | Osterdock et al. |
| 5,450,344 A | 9/1995 | Woo et al. |
| 5,504,684 A | 4/1996 | Lau et al. |
| 5,519,884 A | 5/1996 | Duque-Anton et al. |
| 5,535,278 A | 7/1996 | Cahn et al. |
| 5,592,173 A | 1/1997 | Lau et al. |
| 5,625,668 A | 4/1997 | Loomis et al. |
| 5,663,734 A | 9/1997 | Krasner |
| 5,663,735 A | 9/1997 | Eshenbach |
| 5,721,555 A | 2/1998 | Lennen |
| 5,781,156 A | 7/1998 | Krasner |
| 5,786,789 A | 7/1998 | Janky |
| 5,808,582 A | 9/1998 | Woo |
| 5,812,087 A | 9/1998 | Krasner |
| 5,825,327 A | 10/1998 | Krasner |
| 5,828,694 A | 10/1998 | Schipper |
| 5,831,574 A | 11/1998 | Krasner |
| 5,841,396 A | 11/1998 | Krasner |
| 5,845,203 A | 12/1998 | LaDue |
| 5,854,605 A | 12/1998 | Gildea |
| 5,874,914 A | 2/1999 | Krasner |
| 5,877,724 A | 3/1999 | Davis |
| 5,877,725 A | 3/1999 | Kalafus |
| 5,883,594 A | 3/1999 | Lau |
| 5,884,214 A | 3/1999 | Krasner |
| 5,889,474 A | 3/1999 | LaDue |
| 5,903,654 A | 5/1999 | Milton et al. |
| 5,907,578 A | 5/1999 | Pon et al. |
| 5,907,809 A | 5/1999 | Molnar et al. |
| 5,917,444 A | 6/1999 | Loomis et al. |
| 5,920,283 A | 7/1999 | Shaheen et al. |
| 5,923,703 A | 7/1999 | Pon et al. |
| 5,926,131 A | 7/1999 | Sakumoto et al. |
| 5,936,572 A | 8/1999 | Loomis et al. |
| 5,943,363 A | 8/1999 | Hanson et al. |
| 5,945,944 A | 8/1999 | Krasner |
| 5,963,582 A | 10/1999 | Stansell, Jr. |
| 5,966,403 A | 10/1999 | Pon |
| 5,977,909 A | 11/1999 | Harrison et al. |
| 5,978,669 A | 11/1999 | Sanmugam |
| 5,982,324 A | 11/1999 | Watters et al. |
| 5,982,811 A | 11/1999 | Harrison |
| 5,987,016 A | 11/1999 | He |
| 5,987,381 A | 11/1999 | Oshizawa |
| 5,995,042 A | 11/1999 | Durboraw, III et al. |
| 5,999,124 A | 12/1999 | Sheynblat |
| 6,002,362 A | 12/1999 | Gudat |
| 6,002,363 A | 12/1999 | Krasner |
| 6,009,118 A | 12/1999 | Tiemann et al. |
| 6,009,551 A | 12/1999 | Sheynblat |
| 6,016,119 A | 1/2000 | Krasner |
| 6,028,887 A | 2/2000 | Harrison |
| 6,040,798 A | 3/2000 | Kinal et al. |
| 6,041,222 A | 3/2000 | Horton et al. |
| 6,047,017 A | 4/2000 | Cahn et al. |
| 6,052,081 A | 4/2000 | Krasner |
| 6,061,018 A | 5/2000 | Sheynblat |
| 6,064,336 A | 5/2000 | Krasner |
| 6,104,338 A | 8/2000 | Krasner |
| 6,104,340 A | 8/2000 | Krasner |
| 6,107,960 A | 8/2000 | Krasner |
| 6,111,540 A | 8/2000 | Krasner |
| 6,131,067 A | 10/2000 | Girerd et al. |
| 6,133,871 A | 10/2000 | Krasner |
| 6,133,873 A | 10/2000 | Krasner |
| 6,133,874 A | 10/2000 | Krasner |
| 6,150,980 A | 11/2000 | Krasner |
| 6,178,195 B1 | 1/2001 | Durboraw, III et al. |
| 6,185,427 B1 | 2/2001 | Krasner |
| 6,208,290 B1 | 3/2001 | Krasner |
| 6,208,291 B1 | 3/2001 | Krasner |
| 6,215,441 B1 | 4/2001 | Moeglein |
| 6,215,442 B1 | 4/2001 | Sheynblat |
| 6,236,354 B1 | 5/2001 | Krasner |
| 6,239,742 B1 | 5/2001 | Krasner |
| 6,241,059 B1 | 6/2001 | Fujita et al. |
| 6,259,399 B1 | 7/2001 | Krasner |
| 6,272,430 B1 | 8/2001 | Krasner |
| 6,282,231 B1 | 8/2001 | Norman et al. |
| 6,289,041 B1 | 9/2001 | Krasner |
| 6,295,024 B1 | 9/2001 | King et al. |
| 6,307,504 B1 | 10/2001 | Sheynblat |
| 6,313,786 B1 | 11/2001 | Sheynblat et al. |
| 6,313,787 B1 | 11/2001 | King et al. |
| 6,314,308 B1 | 11/2001 | Sheynblat |
| 6,327,473 B1 | 12/2001 | Soliman et al. |
| 6,332,086 B2 | 12/2001 | Avis |
| 6,377,209 B1 | 4/2002 | Krasner |
| 6,408,196 B2 | 6/2002 | Sheynblat |
| 6,411,254 B1 | 6/2002 | Moeglein |
| 6,411,892 B1 | 6/2002 | Van Diggelen |
| 6,414,987 B1 | 7/2002 | Pon |
| 6,417,801 B1 | 7/2002 | Van Diggelen |
| 6,421,002 B2 | 7/2002 | Krasner |
| 6,429,814 B1 | 8/2002 | Van Diggelen et al. |
| 6,433,731 B1 | 8/2002 | Sheynblat |
| 6,441,781 B1 | 8/2002 | Rog et al. |
| 6,466,161 B2 * | 10/2002 | Turetzky et al. ........ 342/357.06 |
| 6,466,612 B2 | 10/2002 | Kohli et al. |
| 6,484,097 B2 | 11/2002 | Fuchs et al. |
| 6,487,499 B1 | 11/2002 | Fuchs et al. |
| 6,510,387 B2 | 1/2003 | Fuchs et al. |
| 6,529,829 B2 * | 3/2003 | Turetzky et al. ............. 701/213 |
| 6,542,821 B2 | 4/2003 | Krasner |
| 6,583,757 B2 | 6/2003 | Krasner |
| 6,597,311 B2 | 7/2003 | Sheynblat |
| 6,633,255 B2 | 10/2003 | Krasner |
| 6,650,694 B1 | 11/2003 | Brown et al. |
| 6,680,695 B2 * | 1/2004 | Turetzky et al. ........ 342/357.12 |
| 6,707,423 B2 * | 3/2004 | Turetzky et al. ........ 342/357.12 |
| 6,788,251 B2 | 9/2004 | Townsend et al. |
| 6,788,735 B2 | 9/2004 | Kohli |
| 6,873,288 B2 | 3/2005 | Heppe |
| 6,901,260 B1 | 5/2005 | Xin |
| 7,026,986 B2 * | 4/2006 | Turetzky et al. ........ 342/357.12 |
| 7,106,786 B2 | 9/2006 | Turetzky et al. |
| 7,183,972 B2 * | 2/2007 | Turetzky et al. ........ 342/357.12 |
| 7,197,305 B2 * | 3/2007 | Turetzky et al. ............. 455/434 |
| 7,365,680 B2 * | 4/2008 | Turetzky et al. ........ 342/357.12 |
| 2001/0046256 A1 | 11/2001 | Norman et al. |
| 2002/0024462 A1 | 2/2002 | Turetzky et al. |

| | | |
|---|---|---|
| 2002/0024463 A1 | 2/2002 | Turetzky et al. |
| 2002/0025828 A1 | 2/2002 | Turetzky et al. |
| 2002/0026282 A1 | 2/2002 | Turetzky et al. |
| 2002/0064209 A1 | 5/2002 | Turetzky et al. |
| 2003/0011512 A1 | 1/2003 | Turetzky et al. |
| 2003/0132878 A1 | 7/2003 | Devereaux et al. |
| 2003/0154025 A1 | 8/2003 | Fuchs et al. |
| 2004/0113837 A1 | 6/2004 | Heppe |
| 2004/0137914 A1 | 7/2004 | Turetzky et al. |
| 2004/0217901 A1 | 11/2004 | Turetzky et al. |
| 2005/0248483 A1 | 11/2005 | Martin |
| 2006/0152409 A1 | 7/2006 | Raman et al. |
| 2007/0207803 A1 * | 9/2007 | Turetzky et al. ............ 455/434 |

FOREIGN PATENT DOCUMENTS

| | | |
|---|---|---|
| GB | 2115195 | 1/1983 |
| JP | 58-105632 | 6/1983 |
| JP | 7-36035 | 5/1986 |
| JP | 4-326079 | 11/1992 |
| WO | WO 90/11652 | 10/1990 |
| WO | WO 00/45191 | 8/2000 |

OTHER PUBLICATIONS

Marketing Material: Chipset/uN9.times.18 GPS Receiver Solution (9 pages).

Marketing Material: Press Release: Broadcom introduces Advanced Single Chip GPS Solution for Mobile Applications (3 pages).

* cited by examiner

METHOD FOR REDUCING AUTO-CORRELATION OR CROSS-CORRELATION IN WEAK SIGNALS

CROSS-REFERENCE TO RELATED APPLICATIONS

This application claims priority under 35 U.S.C. §119(e) of U.S. Provisional Patent Application No. 60/227,674, filed Aug. 24, 2000, entitled "METHOD AND APPARATUS FOR ELIMINATING AUTO-CORRELATION OR CROSS-CORRELATION IN WEAK CDMA SIGNALS," by Gregory B. Turetzky, et al., which application is incorporated by reference herein.

This application is also related to the following:

U.S. patent application Ser. No. 09/910,092, filed on Jul. 20, 2001, entitled "APPARATUS FOR REDUCING AUTO-CORRELATION OR CROSS-CORRELATION IN WEAK SIGNALS," by Gregory B. Turetzky, et al.;

U.S. patent application Ser. No. 09/910,404, filed on Jul. 20, 2001, now U.S. Pat. No. 6,680,695, entitled "COMMUNICATIONS SYSTEM THAT REDUCES AUTO-CORRELATION OR CROSS-CORRELATION IN WEAK SIGNALS," by Gregory B. Turetzky, et al;

U.S. patent application Ser. No. 09/910,091, filed on Jul. 20, 2001, now U.S. Pat. No. 6,466,161, entitled "LOCATION SERVICES SYSTEM THAT REDUCES AUTO-CORRELATION OR CROSS-CORRELATION IN WEAK SIGNALS," by Gregory B. Turetzky, et al.;

U.S. patent application Ser. No. 09/909,717, filed on Jul. 20, 2001, now U.S. Pat. No. 6,529,829, entitled "DEAD RECKONING SYSTEM FOR REDUCING AUTO-CORRELATION OR CROSS-CORRELATION IN WEAK SIGNALS," by Gregory B. Turetzky, et al.;

U.S. patent application Ser. No. 09/909,716, filed on Jul. 20, 2001, now U.S. Pat. No. 7,106,786, entitled "METHOD FOR REDUCING AUTO-CORRELATION OR CROSS-CORRELATION IN WEAK SIGNALS," by Gregory B. Turetzky, et al.;

U.S. patent application Ser. No. 10/244,293, filed on Sep. 16, 2002, now U.S. Pat. No. 6,707,423, entitled "LOCATION SERVICES SYSTEM THAT REDUCES AUTO-CORRELATION OR CROSS-CORRELATION IN WEAK SIGNALS," by Gregory B. Turetzky et al.;

U.S. patent application Ser. No. 10/712,789, filed on Nov. 12, 2003, entitled "COMMUNICATION SYSTEM THAT REDUCES AUTO-CORRELATION OR CROSS-CORRELATION IN WEAK SIGNALS," by Gregory B. Turetzky, et al.;

U.S. patent application Ser. No. 10/775,870, filed on Feb. 10, 2004, now U.S. Pat. No. 7,026,986, entitled "LOCATION SERVICES SYSTEM THAT REDUCES AUTO-CORRELATION OR CROSS-CORRELATION IN WEAK SIGNALS," by Gregory B. Turetzky, et al.; and U.S. patent application Ser. No. 11/345,635, filed on Jan. 31, 2006, entitled "LOCATION SERVICES SYSTEM THAT REDUCES AUTO-CORRELATION OR CROSS-CORRELATION IN WEAK SIGNALS," by Gregory B. Turetzky, et al.; which applications are all incorporated by reference herein.

BACKGROUND OF THE INVENTION

1. Field of the Invention

The present invention relates in general to Global Positioning System (GPS) receivers, and in particular to systems, methods, and apparatuses for reducing or eliminating auto-correlation or cross-correlation in weak Code Division Multiple Access (CDMA) signals in the presence of strong CDMA signals.

2. Description of the Related Art

Cellular telephony, including Personal Communication System (PCS) devices, has become commonplace. The use of such devices to provide voice, data, and other services, such as Internet access, has provided many conveniences to cellular system users. Further, other wireless communications systems, such as two-way paging, trunked radio, Specialized Mobile Radio (SMR) that is used by police, fire, and paramedic departments, have also become essential for mobile communications.

A current thrust in the cellular and PCS arena is the integration of Global Positioning System (GPS) technology into cellular telephone devices and other wireless transceivers. For example, U.S. Pat. No. 5,874,914, issued to Krasner, which is incorporated by reference herein, describes a method wherein the basestation (also known as the Mobile Telephone Switching Office (MTSO)) transmits GPS satellite information, including Doppler information, to a remote unit using a cellular data link, and computing pseudoranges to the in-view satellites without receiving or using satellite ephemeris information.

This current interest in integrating GPS with cellular telephony stems from a new Federal Communications Commission (FCC) requirement that cellular telephones be locatable within 50 feet once an emergency call, such as a "911" call (also referred to as "Enhanced 911" or "E911") is placed by a given cellular telephone. Such position data assists police, paramedics, and other law enforcement and public service personnel, as well as other agencies that may need or have legal rights to determine the cellular telephone's position. Further, GPS data that is supplied to the mobile telephone can be used by the mobile telephone user for directions, location of other locations that the cellular user is trying to locate, determination of relative location of the cellular user to other landmarks, directions for the cellular user via Internet maps or other GPS mapping techniques, etc. Such data can be of use for other than E911 calls, and would be very useful for cellular and PCS subscribers.

The approach in Krasner, however, is limited by the number of data links that can be connected to a GPS-dedicated data supply warehouse. The system hardware would need to be upgraded to manage the additional requirements of delivering GPS information to each of the cellular or PCS users that are requesting or requiring GPS data, which requirements would be layered on top of the requirements to handle the normal voice and data traffic being managed and delivered by the wireless system.

Krasner, however, does not discuss the problems of acquisition of a GPS satellite signal in difficult environments, such as urban areas, or where the mobile receiver has a limited or completely blocked view of the satellites. Inherent in such difficult environments is the ability of a sensitive receiver to acquire spurious signals in the electromagnetic spectrum.

Some of these spurious signals emanate from the GPS satellite that the mobile receiver is trying to acquire. If the mobile receiver sweeps through a subset of all of the possible codes, and finds a signal that is above the noise floor the receiver will lock onto this signal. However, the receiver has no way of knowing if the signal it has chosen to lock onto is the proper signal, especially in weak signal environments. This type of event, where the receiver locks onto a spurious signal emanating from the GPS satellite of interest, is called "auto-correlation." Auto-correlation can also occur in a strong signal environment, where the signal acquired is not the proper signal.

Other spurious signals emanate from other GPS satellites that are either within the line of sight of the mobile receiver, or, because of multi-path conditions, is not within the line of sight of the mobile receiver, and create the same problems as auto-correlation scenarios described above. However, when the spurious signal emanates from a GPS satellite other than the satellite of interest, the event is called "cross-correlation."

Currently, there are no methods or devices designed to determine whether an auto-correlation or cross-correlation event has occurred. There are also no methods or devices designed to correct such events to ensure that the receiver is locked onto the proper signal.

It can be seen, then, that there is a need in the art for a method to determine whether an auto-correlation event or cross-correlation event has occurred. It can also be seen that there is a need in the art for a method to correct auto-correlation or cross-correlation events to allow the GPS receiver to lock onto the proper signal. It can also be seen that there is a need in the art for an apparatus to determine whether an auto-correlation event or cross-correlation event has occurred. It can also be seen that there is a need in the art for an apparatus to correct auto-correlation or cross-correlation events to allow the GPS receiver to lock onto the proper signal.

SUMMARY OF THE INVENTION

To minimize the limitations in the prior art, and to minimize other limitations that will become apparent upon reading and understanding the present specification, the present invention discloses systems, methods and apparatuses for determining if an auto-correlation or cross-correlation event has occurred. The method and apparatus also provide the ability to correct the auto- or cross-correlation event to allow the GPS receiver to lock onto the proper signal.

The present invention also discloses methods and apparatuses for eliminating auto- and cross-correlation in weak signal CDMA systems, such as GPS systems. The invention uses parallel data paths that allow standard correlation of signals in parallel with verification of the lock signal to determine whether the system has locked onto the proper signal within the scanned signal window. The invention can be made with multiple CPUs, a single CPU with dual input modes, on multiple IC chips, or as a single IC chip solution for small, low cost reception, downconversion, correlation, and verification systems.

A method in accordance with the present invention comprises correlating an incoming CDMA signal, located within a scanned signal window, with a locally generated signal on a first data path, verifying the incoming CDMA signal against a lock signal on a second data path, determining, using the second data path, whether the incoming CDMA signal has at least one characteristic which differentiates the incoming CDMA signal from an auto-correlated or cross-correlated signal, and continuing to search the scanned signal window for a second incoming CDMA signal if the incoming CDMA signal lacks the at least one characteristic.

It is an object of the present invention to provide a method to determine whether an auto-correlation event or cross-correlation event has occurred. It is another object of the present invention to provide a method to correct auto-correlation or cross-correlation events to allow the GPS receiver to lock onto the proper signal. It is another object of the present invention to provide an apparatus to determine whether an auto-correlation event or cross-correlation event has occurred. It is another object of the present invention to provide an apparatus to correct auto-correlation or cross-correlation events to allow the GPS receiver to lock onto the proper signal.

BRIEF DESCRIPTION OF THE DRAWINGS

Referring now to the drawings in which like reference numbers represent corresponding parts throughout.

DETAILED DESCRIPTION OF THE DRAWINGS

In the following description of the preferred embodiment, reference is made to the accompanying drawings that form a part hereof, and in which is shown by way of illustration a specific embodiment in which the invention may be practiced. It is to be understood that other embodiments may be utilized and structural changes may be made without departing from the scope of the present invention.

Overview

In CDMA signal environments, cross- and/or auto-correlation problems occur that need to be corrected. The present invention performs a verification of the signal used for locking if the detected signal is weaker in signal strength than is expected by the receiver. If the expected determined flocking) signal is strong, or, at least, not weak, then no verification is required. However, if, by Signal-to-Noise Ratio measurements, or other methods, the determined signal is found to be below a predetermined signal strength, then the receiver may be receiving an improper locking signal, and thus, auto- or cross-correlation ghost signals may be the signal that the receiver is locking onto. The present invention discusses how to reduce or eliminate such auto and/or cross correlation problems.

Figure 1:
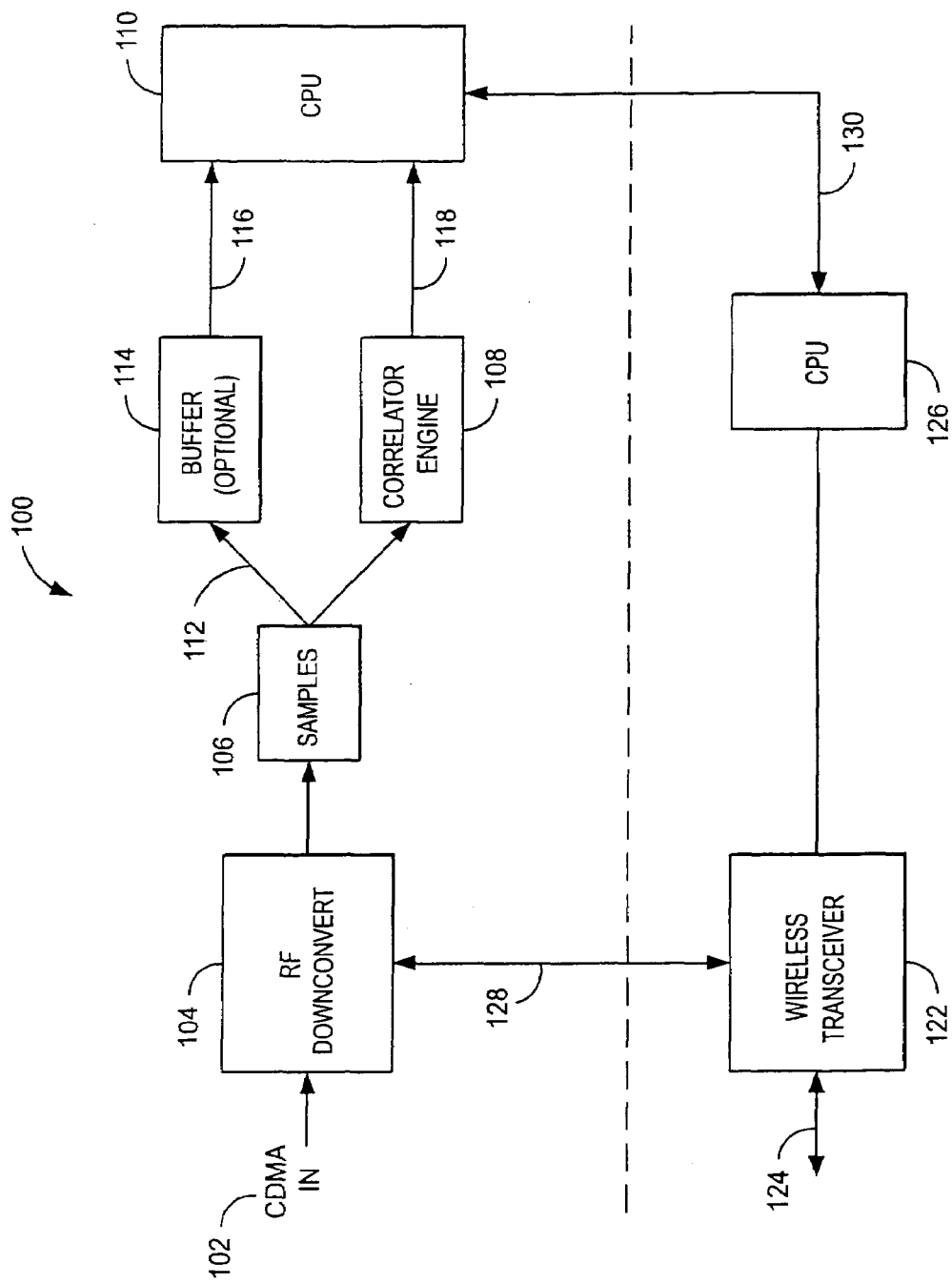
FIG. 1 illustrates a typical CDMA signal flow.

FIG. 1 illustrates a typical Code Division Multiple Access (CDMA) signal flow. In many systems 100, e.g., GPS receiver systems, cellular telephone systems, etc., CDMA input signals 102 enter an RF downconverter 104 for conversion to baseband signals. These baseband signals are then sampled in a sampler 106 to obtain digital samples of the CDMA input signals 102. Typically, especially in a GPS receiver system 100, these samples are then sent to correlator engine 108 and then on to Central Processing Unit (CPU) 110.

The present invention allows for a separate path for the signals 112 to reach the CPU 110. The signals 112, which are the same samples that are used in the correlator engine 108, are sent directly to the CPU 110, or, optionally, through a buffer 114. Although the signals 112 can be sent directly to the same CPU 110 for processing, which CPU is typically an ARM7, signals 112 can be sent to a separate Digital Signal Processor (DSP), or, alternatively, to a CPU 110 that incorporates the DSP and ARM7 on a single integrated circuit (IC) chip. Further, the correlator engine 108, CPU 110, and optional buffer 114 can be on a single IC chip to allow for lower power consumption, smaller packaging of the system 100, etc. The RF downconverter 104 can also be integrated with correlator engine 108, CPU 110, sampler 106, and optional buffer 114 to provide a single IC chip system 100 if desired. Further, for ease of integration, CPU 110 can accept signals 116 and 118 at different ports, or signals 116 and 118 can be sent to separate CPUs 110, e.g., signals 116 can be sent to a DSP, while signals 118 can be sent to an ARM7. Other configurations having single or multiple CPUs 110 may be realized with the present invention. FIG. 1 is illustrative, but not exhaustive, of the possibilities of signal flow within the scope of the present invention.

Typically, in a communications system, the GPS receiver system 100 is co-located with another system that allows for transmission, such as a cellular telephone system 120. The cellular telephone transceiver 122, typically located in a cellular handset, can transmit and receive signals 124 on a wireless or hardwired link. Such a system 120 is embodied in the cellular telephone network, Personal Communications System (PCS) network, or can also be embodied as a Personal Data Assistant (PDA), laptop computer, or any other device that can transmit and/or receive data via wireless or hardwired communications links.

Such a communications system 120, when co-located with the GPS receiver system 100, uses the GPS receiver system 100 to determine location and use the determined location for various purposes, e.g., location services, determining or computing the location of the wireless transceiver 122, determining directions to a predetermined or desired location, pinpointing the location of the wireless transceiver 122 for emergency and/or law enforcement personnel, etc.

As such, the present invention is useful in a location services system, where users wish to use their mobile GPS receiver systems 100, possibly located inside of a cellular telephone, to get directions, get assistance finding nearby points of interest, restaurants, or other physical locations that may be difficult to locate without some sort of mapping aid, A cellular telephone or other mobile device can display, either visually or otherwise, the user's location, the user's location on a map, a route or part of a route between the user's location and the desired destination, or any number of things that can be used for location services.

Further, the present invention is also useful in a dead reckoning system, wherein at least one sensor, such as a gyroscope, odometer, or other sensor, provides inputs to the GPS receiver system 100 to selectively assist in computing a position of the GPS receiver system 100. Such systems are typically used in automobiles that travel into places where tunnels and other natural and man-made structures interfere with the receipt of GPS signals, but can also be used on or in conjunction with cellular telephones, wireless transceivers, or other devices.

Further, since both the wireless transceiver 122 and GPS receiver system 100 are typically integrated circuits, for ease of packaging, lower power consumption, or other reasons, the GPS receiver system 100 and the wireless transceiver 122 can be located on a single integrated circuit, or can share circuitry between the wireless transceiver and the GPS receiver system 100. For example, the GPS receiver system 100 can use the Central Processing Unit (CPU) 126 of the wireless transceiver 122 to perform mathematical calculations needed to determine the position of the wireless transceiver 122, either instead of or in parallel with CPU 110. Further, the wireless transceiver 122 can share other portions of the circuitry, such as a local oscillator to provide a reference frequency 128 to the GPS receiver system 100, and the reference frequency 128 can either be the same as or different from the reference frequency used by the wireless transceiver 122.

The wireless transceiver 122 can accept data 130 from the GPS receiver system 100, as well as provide data 130 to the GPS receiver system 100. Data 130 accepted by the wireless transceiver 122 includes raw GPS data, pseudoranges, or a determined position. Data 130 provided by the wireless transceiver includes ephemeris information, time information, and coarse position information.

Figure 2:
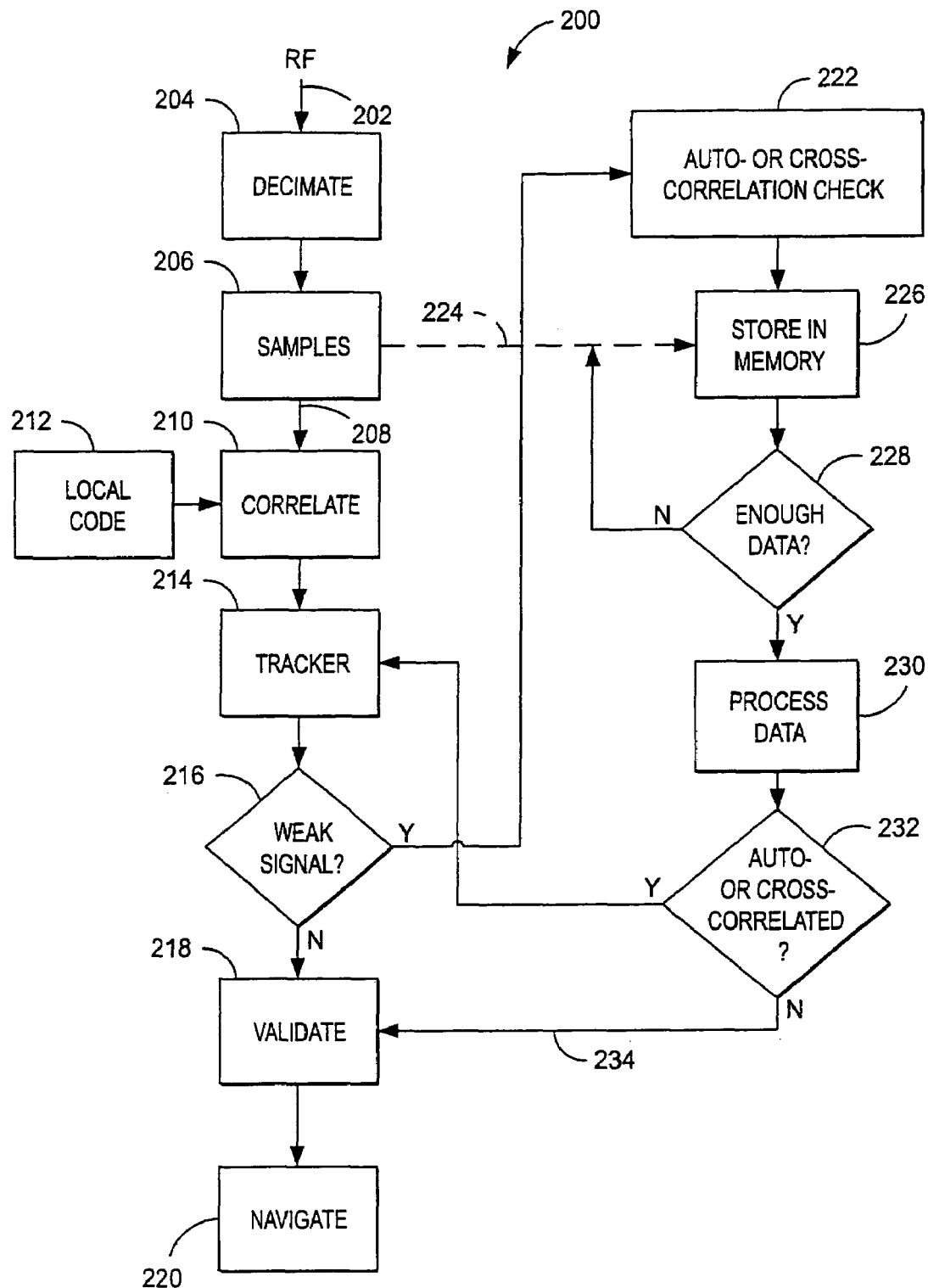
FIG. 2 illustrates an auto and cross correlation check in accordance with the present invention.

FIG. 2 illustrates an auto and cross correlation check in accordance with the present invention.

System 200 shows RF signal 202 entering system 200, where it is decimated in decimate block 204. The result of decimate block 204 is the reduced bandwidth samples from RF signal 202, shown as block 206. These samples 208 are typically passed to a correlator engine 108 shown in FIG. 1. The local code 212 is then correlated against the incoming samples 208 in block 210, which are then passed to the tracker 214 such that system 200 can track the RF input signal 202.

Related art designs do not determine whether the tracker 214 is tracking the carrier or desired signal, or whether tracker 214 is tracking a spurious signal, which may be a cross-correlated spur or an auto-correlated spur. The present invention provides a method and apparatus for verifying whether the tracker 214 is tracking the correct or desired signal before the signal is validated for use in navigation.

The signal strength of the signal being tracked is checked in block 216. If the signal strength is greater than a predetermined strength, e.g., greater than 35 dB-Hz, then the system 200 knows that the signal is strong enough that it is not a spurious signal, and the signal is validated in block 218, and passed to the navigation system in block 220. However, if the signal is not of sufficient strength, the auto-correlation check block 222 is entered. Block 222 can be the same block for a cross-correlation check, or can be a different block of computer code, hardware circuitry, or integration of hardware, software, firmware, or other devices and methods used to perform similar functions to those described herein. Further, block 222 can be a threshold Signal-to-Noise Ratio (SNR) verification, or other such verification to determine whether auto/cross correlation conditions exist. Such a check block can have one characteristic of the signal checked, can have multiple characteristics to check, or can select from one or more characteristics to be checked, either automatically or manually selected, depending on the design or desires of the user.

Samples 206 are stored in memory as shown by path 224 and block 226. If the samples do not comprise enough data, e.g., if there is less data than a predetermined amount of data, block 228 will loop around until there is enough data in the system. As shown in FIG. 2, the system 200 continues to store sample data until there is enough data to process. For example, in the GPS system, 2 msec of data is desired to perform processing to determine whether the signal is the proper signal.

Block 230 shows processing the stored data to determine whether the signal that has been tracked (or locked onto) in block 214 is the proper signal within the scanned signal window. In a cross-correlation situation, the proper signal can be determined by a correlation to a different satellite code being stronger than the correlation to a desired (or current) satellite code. In an auto-correlation situation, the proper signal may be determined by a correlation to a different delay of the same satellite code being stronger than the correlation to the locally generated code delay. Decision block 232 shows that the system 200 verifies that the signal is or is not the proper signal, again, via SNR verification or other methods.

The correlation methods used on the verification signal, which is on a second path relative to the incoming signal, include computing the correlation between the sample data and the same prn code and local reference frequency of the tracked signal (signal that has been locked to), computing the correlation between the sample data and a different prn code but the same local reference frequency as the tracked signal, computing the correlation between the sample data and the same prn code and local reference frequency that is a multiple of the prn repeat frequency of the tracked signal, computing the correlation between the sample data and a different prn code and different local reference frequency that is a multiple of the prn repeat frequency of the locked signal, and other correlations and methods. If the signal is the proper signal, the signal is verified and validated via path 234. If the signal is not the proper signal, then the tracker 214 is redirected or otherwise controlled to the proper signal, which proper signal was determined in block 230.

Figure 3A:
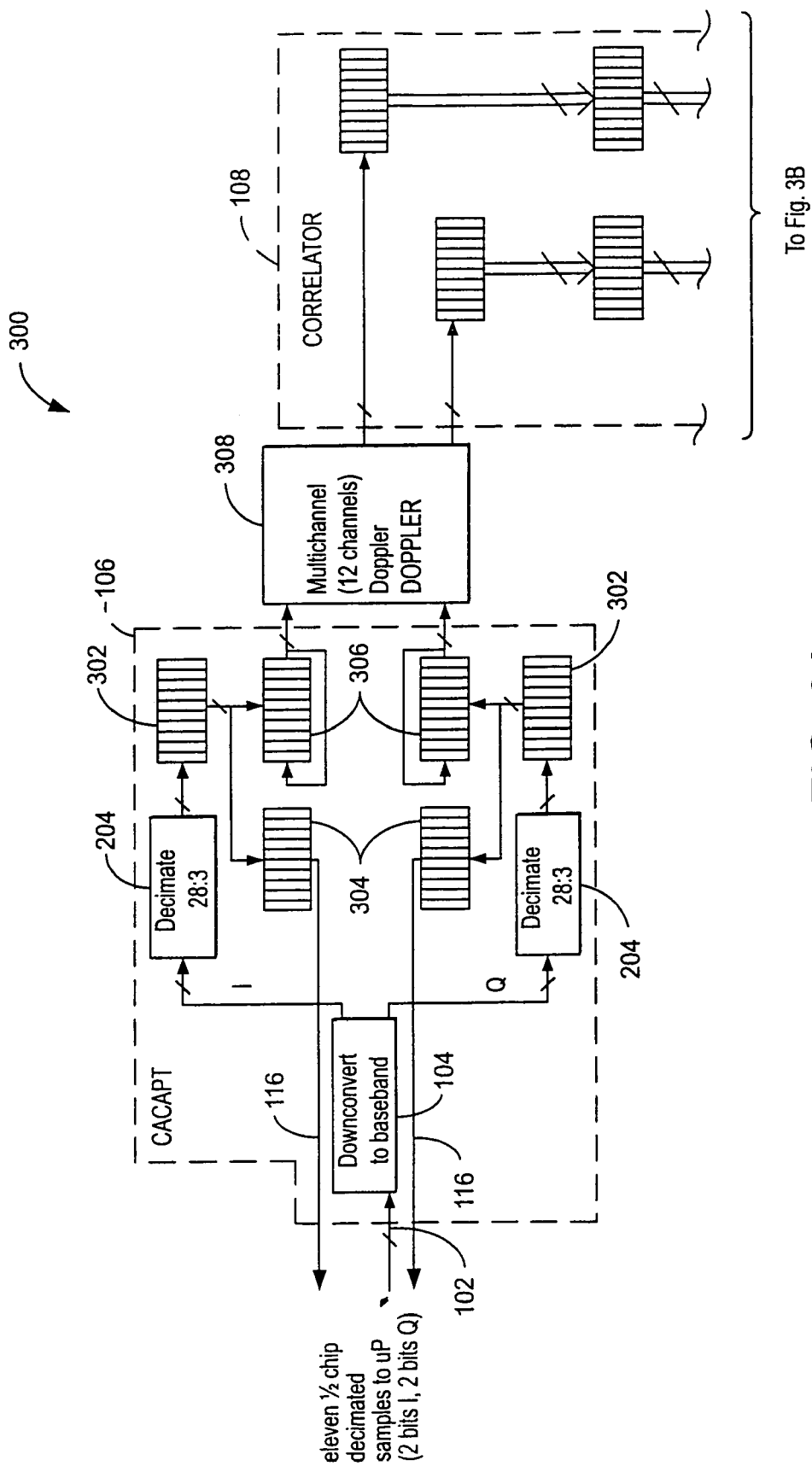
FIGS. 3A and 3B illustrate an embodiment of the present invention.
Figure 3B:
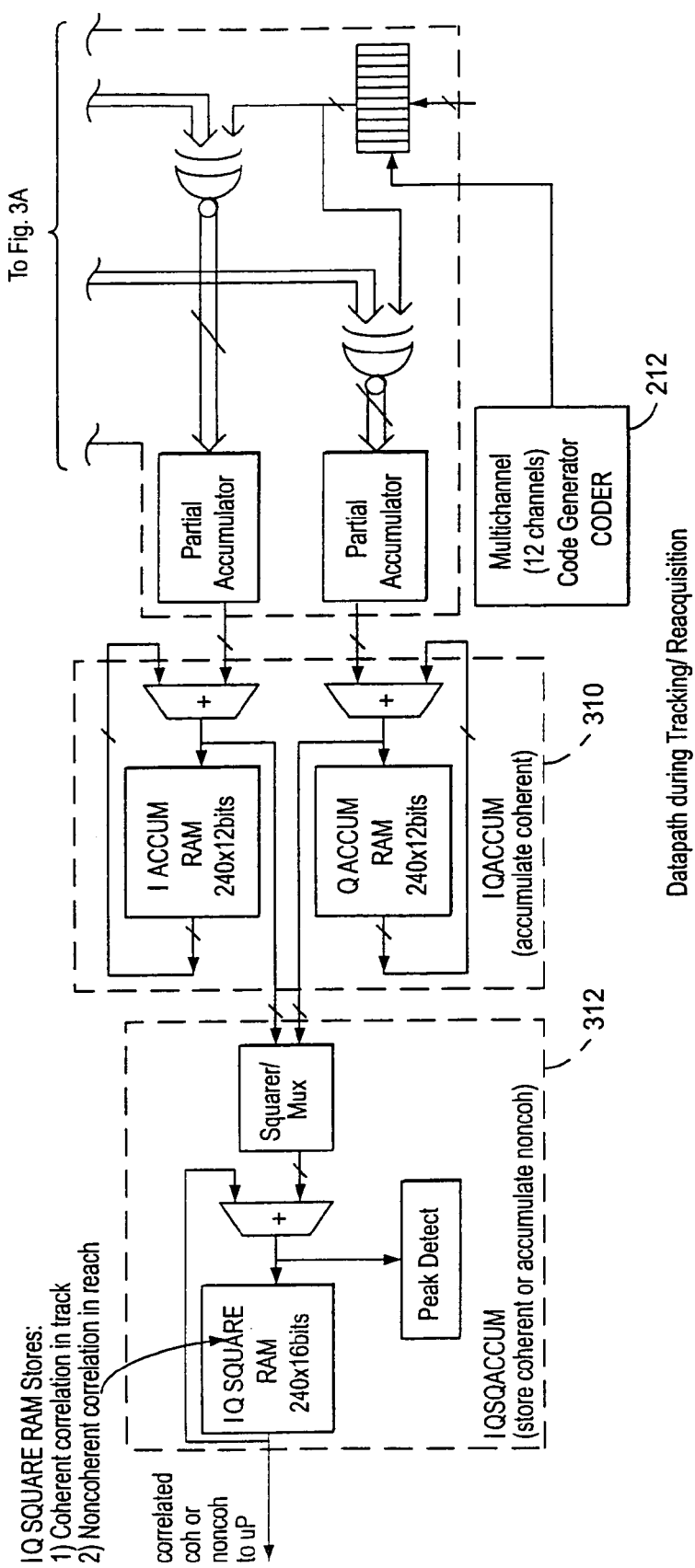

FIGS. 3A and 3B illustrate an embodiment of the present invention.

System 300 shows GPS Clear/Acquisition (also known as Coarse/Acquisition) (C/A) (CDMA formatted RF signals) data 102 entering the downconverter 104, which downconverts the CDMA signal to baseband for processing. The downconverter passes the signals to the decimators 204, which are part of the sample block 106. These are passed to serial shift registers 302, and then each placed in parallel into two additional registers, parallel register 304 and shift register 306. Shift register 306 is loaded and then shifted out of the register 306, whereas parallel register 304 is loaded and read directly by the CPU 110. Parallel registers 304 provide signals 116 that are delivered directly to the CPU (microprocessor) 116, whereas shift registers 306 provide signals to the correlator engine 108. A Doppler rotator 308 is used to properly align in frequency the signals being fed into the correlator 108.

Local code, emanating from coder 212, is used to correlate against the incoming samples in determining the proper signal to lock onto within the sampled signals from sampler 106. The signals are accumulated in the accumulator 310, and a peak detector 312 determines the signal that is passed to the tracker, which is signal 118 shown in FIG. 1. Coder 212 is shifted in time and/or phase to assist in correlation. This shift is typically done by a separate circuit, and in the present invention, can be done by a data path executive when the incoming signal is determined to be an auto-correlated or cross-correlated signal.

Figure 4:
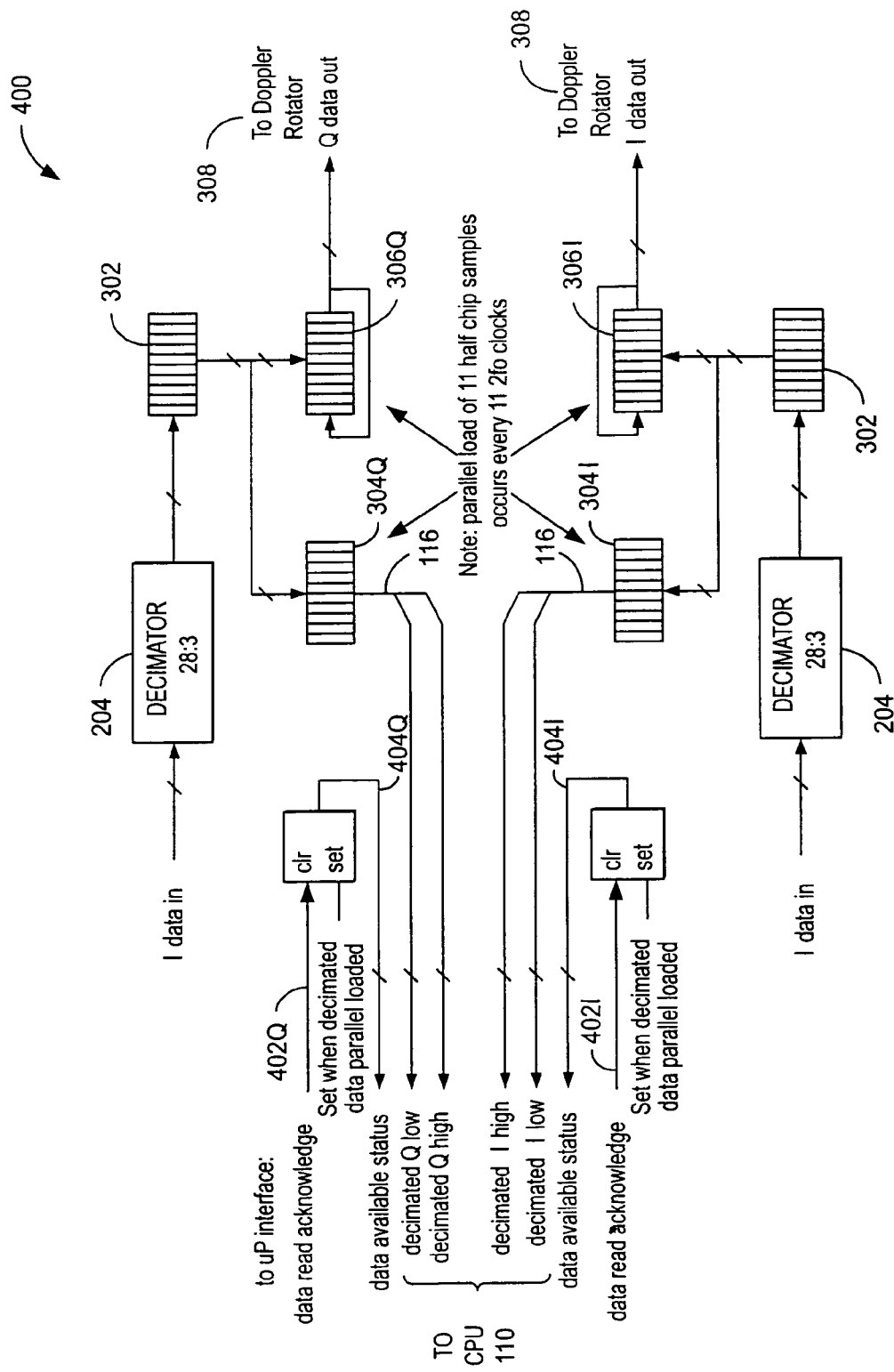
FIG. 4 illustrates details of the sample block of the present invention.

FIG. 4 illustrates details of the sample block of the present invention.

System 400 shows the decimators 204 feeding the serial shift registers 302, which each store, in parallel, their data in serial shift registers 304 and 306. For clarity, parallel registers 304 and shift registers 306 have been shown as parallel registers 304I and 304Q, and shift registers 306I and 306Q, to indicate whether the registers contain I data or Q data, respectively. Shift registers 306 pass their data to the Doppler rotator 308, whereas parallel registers 304 pass their parallel data, i.e., signals 116, directly to the CPU 110. Again, CPU 110 can be the same CPU that processes the Doppler rotated correlated signals, or a separate CPU. Further, even if the CPUs are separate, they can be co-located on a single IC chip if desired.

Additional control lines couple the CPU 110 to the capture block (sampler) 106. Lines 402I and 402Q indicate when the CPU 110 has read the data from associated shift registers 306I and 306Q, respectively. Further, data available status lines 404I and 404Q are set to a known value, either high or low, to inform the CPU 110 that the parallel registers 304I and/or 304Q are available for reading. Once the parallel registers 304I and/or 304Q are read, the data available status registers 404I and/or 404Q can be cleared.

Process Chart

Figure 5:
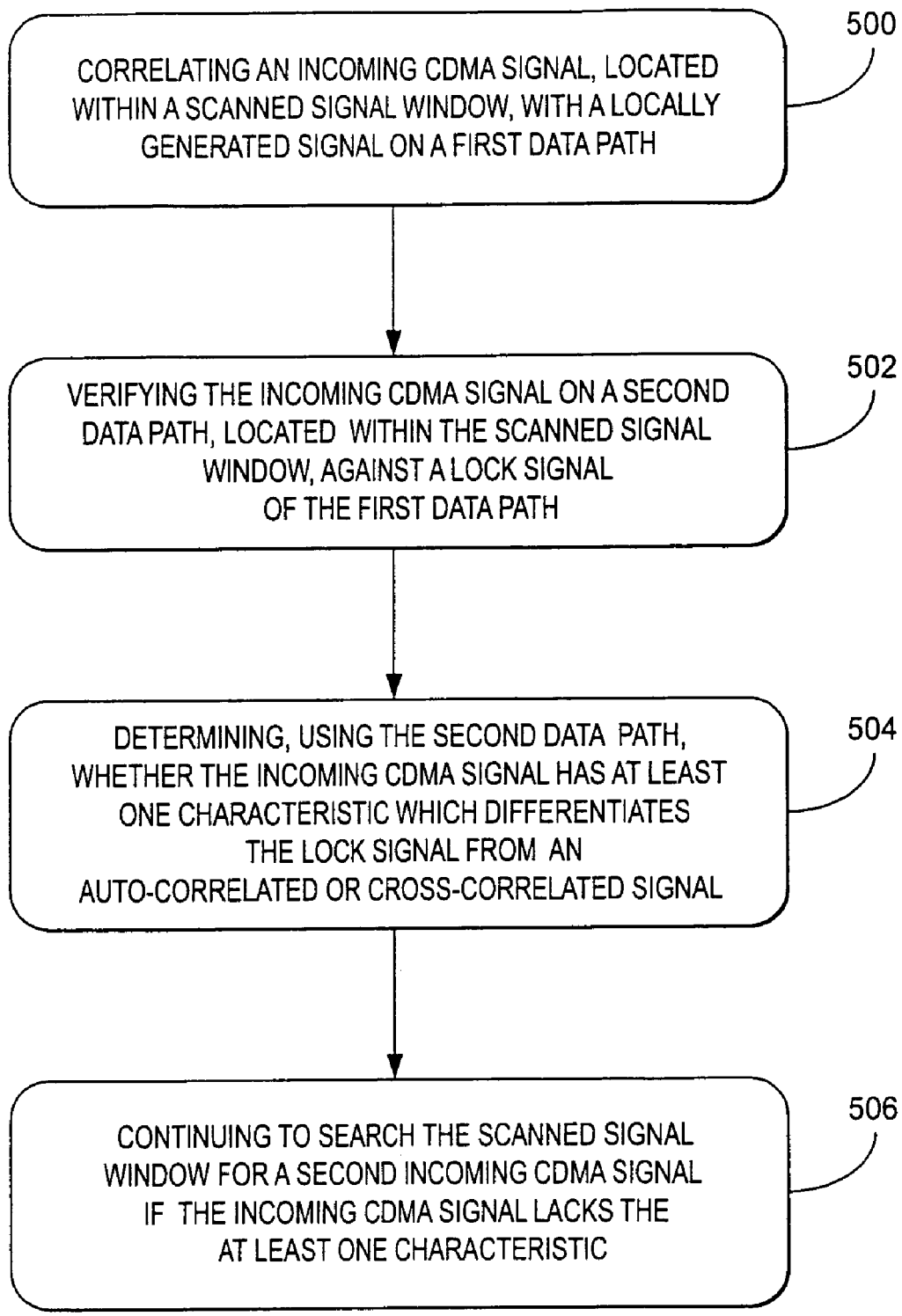
FIG. 5 is a flowchart illustrating the steps used to practice the present invention.

FIG. 5 is a flowchart illustrating the steps used to, practice the present invention.

Block 500 illustrates correlating an incoming CDMA signal, located within a scanned signal window, with a locally generated signal on a first data path.

Block 502 illustrates verifying the incoming CDMA signal, on a second data path, located within the scanned signal window, against a lock signal of the first data path.

Block 504 illustrates determining, using the second data path, whether the incoming CDMA signal has at least one characteristic which differentiates the lock signal, or locally generated signal, from an auto-correlated or cross-correlated signal.

Block 506 illustrates continuing to search the scanned signal window for a second incoming CDMA signal if the lock signal lacks the at least one characteristic.

CONCLUSION

Although the description of the present invention herein describes specific embodiments of the present invention, the scope of the present invention includes other embodiments of the present invention not described herein.

In summary, the present invention describes systems, methods and apparatuses for reducing or eliminating the auto-correlation or cross-correlation events that occur during weak signal conditions. The devices in accordance with the present invention also provides the ability to correct the auto- or cross-correlation event to allow the GPS receiver to lock onto the proper signal.

A method in accordance with the present invention comprises correlating an incoming CDMA signal, located within a scanned signal window, with a locally generated signal on a first data path; verifying the incoming CDMA signal against a lock signal on a second data path, determining, using the second data path, whether the incoming CDMA signal has at least one characteristic which differentiates the incoming CDMA signal from an auto-correlated or cross-correlated signal, and continuing to search the scanned signal window for a second incoming CDMA signal if the incoming CDMA signal lacks the at least one characteristic.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention not be limited by this detailed description, but by the claims appended hereto.

What is claimed is:

1. A method for reducing auto-correlation and cross-correlation in a GPS receiver co-located with a cellular telephone, comprising:

transmitting and receiving cellular telephone signals using a cellular telephone transceiver;

correlating an incoming GPS signal with a locally generated signal, using a first data path;

verifying the incoming GPS signal against a lock signal using a second data path, determining, using the second data path, whether the incoming GPS signal has at least one characteristic that differentiates the incoming GPS signal from a correlated signal selected from a group consisting of an auto-correlated signal and a cross-correlated signal, wherein the at least one characteristic is selected from a group consisting of a correlation to a different satellite code being stronger than the correlation to a desired satellite code, and a correlation to a different delay of the incoming GPS signal being stronger than the correlation to the first data path's locally generated code delay;

monitoring the first data path; and continuing to search for a second incoming GPS signal when the incoming GPS signal does not contain the at least one characteristic.

2. The method of claim 1, wherein the at least one characteristic is selected from a group that further includes a predetermined signal strength of the incoming GPS signal.

3. The method of claim 1, wherein the at least one characteristic is selected from a group that further includes a predetermined Signal-to-Noise Ratio (SNR) of the incoming GPS signal.

4. The method of claim 1, wherein the at least one characteristic is at least two characteristics selected from a group consisting of: a predetermined signal strength of the incoming GPS signal, a predetermined Signal-to-Noise Ratio (SNR) of the incoming GPS signal, and a predetermined amount of data present on the incoming GPS signal.

5. The method of claim 1, wherein the cellular transceiver and the GPS receiver are located on a single integrated circuit.

6. The method of claim 5, wherein the at least one characteristic is a predetermined signal strength of the incoming GPS signal.

7. The method of claim 5, wherein the at least one characteristic is a predetermined Signal-to-Noise Ratio (SNR) of the incoming GPS signal.

8. The method of claim 5, wherein the at least one characteristic is selected from a group consisting of a correlation to a different satellite code being stronger than the correlation to a desired satellite code, and a correlation to a different delay of the incoming GPS signal being stronger than the correlation to the first data path's locally generated code delay.

9. The method of claim 5, wherein the at least one characteristic is at least two characteristics selected from a group consisting of: a predetermined signal strength of the incoming GPS signal, a predetermined Signal-to-Noise Ratio (SNR) of the incoming GPS signal, a correlation to a different satellite code being stronger than the correlation to a desired satellite code, and a correlation to a different delay of the incoming GPS signal being stronger than the correlation to the first data path's locally generated code delay.

10. The method of claim 9, wherein the cellular telephone transceiver and the GPS receiver share a central processing unit.

* * * * *

UNITED STATES PATENT AND TRADEMARK OFFICE
CERTIFICATE OF CORRECTION

PATENT NO. : 7,724,807 B2  
APPLICATION NO. : 11/498532  
DATED : May 25, 2010  
INVENTOR(S) : Turetzky et al.

Page 1 of 1

It is certified that error appears in the above-identified patent and that said Letters Patent is hereby corrected as shown below:

In Column 4, Line 36, delete "flocking)" and insert -- (locking) --, therefor.

Signed and Sealed this
Nineteenth Day of March, 2013

Teresa Stanek Rea
*Acting Director of the United States Patent and Trademark Office*